Oct. 3, 1950     A. J. ROSENBERGER     2,524,602
FORCE MEASURING APPARATUS
Filed June 11, 1945
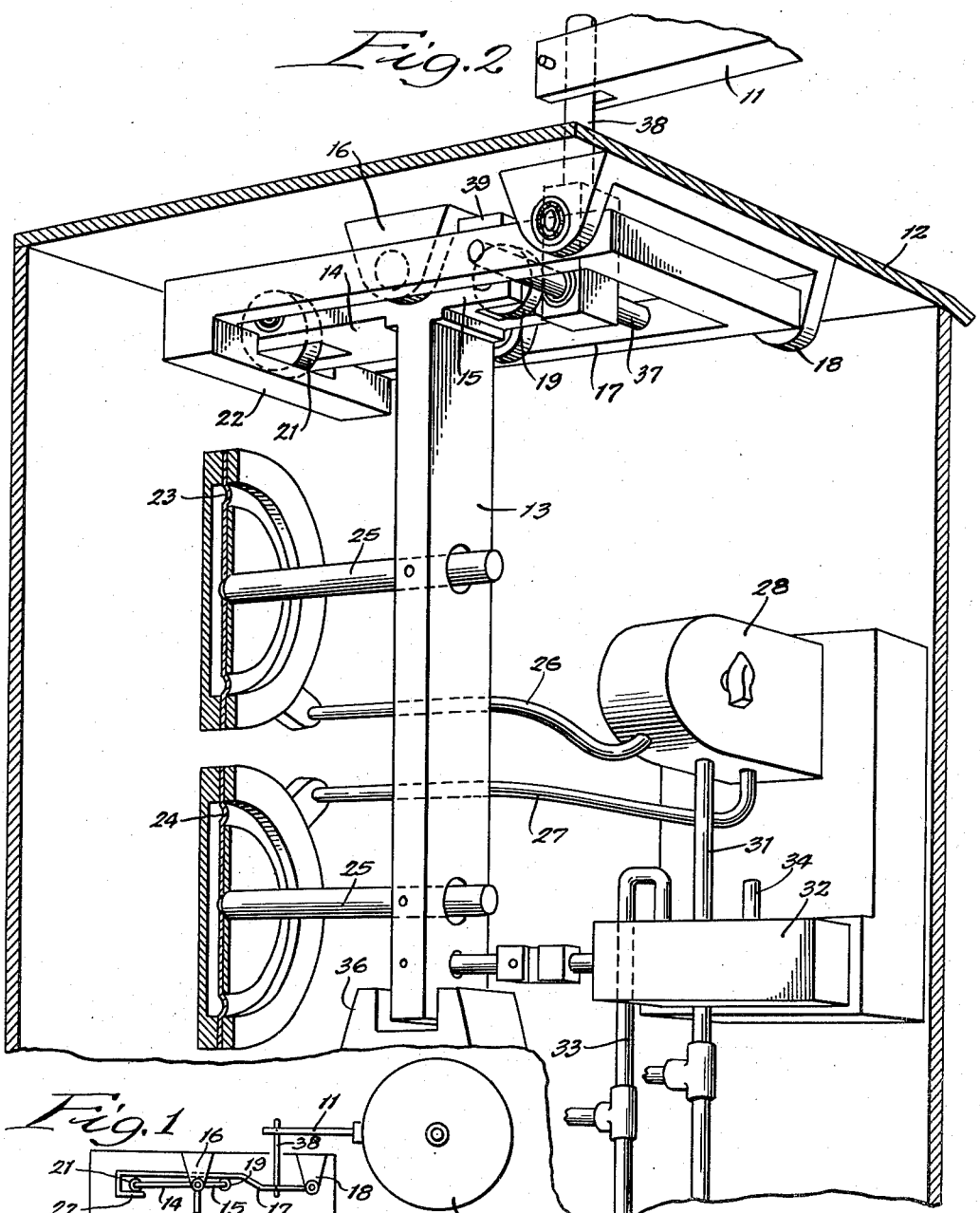
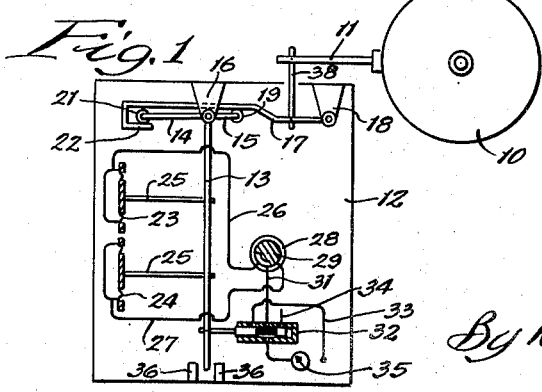
Inventor:
Albert J. Rosenberger,
By Dawson, Ooms and Booth,
Attorneys.

Patented Oct. 3, 1950

2,524,602

UNITED STATES PATENT OFFICE 2,524,602

FORCE MEASURING APPARATUS

Albert J. Rosenberger, Chicago, Ill., assignor to Republic Flow Meters Company, Chicago, Ill., a corporation of Illinois Application June 11, 1945, Serial No. 598,865

6 Claims. (Cl. 137—139)

This invention relates to force measuring apparatus and more particularly to apparatus for measuring and balancing mechanical forces. One of the objects of the invention is to provide apparatus which is capable of operation through several selected ranges accurately to measure and indicate forces of different magnitudes.

Another object is to provide force measuring apparatus which will measure forces acting in either direction without requiring resetting or adjustment.

Still another object is to provide apparatus in which the forces to be measured are balanced by pressure responsive means supplied with a varying actuating pressure. In this construction, the actuating pressure is proportional to and constitutes a measure of the force.

The above and other objects and advantages of the invention will be more readily apparent from the following description when read in connection with the accompanying drawing, in which—

Figure 1 is a diagram of one form of apparatus embodying the invention and

Figure 2 is a partial perspective view with parts broken away and in section, illustrating the apparatus.

As shown in Figure 1, the apparatus is adapted to measure the torque forces on a dynamometer or the like indicated generally at 10 and having a torque arm 11 extending outwardly therefrom. The apparatus comprises a casing 12 adapted to be fixed adjacent the dynamometer. A T beam having a leg 13 and a head including crossarms 14 and 15 is pivoted on brackets 16 in the top of the casing. The T beam is connected to the torque arm 11 of the dynamometer by means of a lever 17 pivoted at one end on brackets 18 in the casing and extending generally parallel to the arms 14 and 15 of the T beam.

In order that the T beam will be urged in one direction about its pivot regardless of the direction of the force on the dynamometer torque arm, rollers 19 and 21 are carried by the ends of the arms 14 and 15 to engage the lever 17. As shown, the roller 19 engages the underside of the lever 17 while the roller 21 engages the upper side of a crossarm 22 on the lever.

The forces tending to tilt the T beam clockwise, as seen in Figure 1, are balanced by a pair of flexible diaphragms 23 and 24 mounted in the casing 12 and connected through rods 25 to the T beam. The diaphragms are supplied with actuating fluid under pressure through conduits 26 and 27 respectively which connect to a distributor valve 28. The distributor valve, as indicated, in the diagram includes a rotor 29 having a groove or passage therein adapted to connect either or both of the lines 26 and 27 to a supply line 31.

The pressure acting on the diaphragms is regulated by a control valve 32 of the pilot valve type supplied at one end with fluid under pressure through a supply line 33, communicating at its center with the line 31 and having an exhaust passage 34 connected to its opposite end. The central portion of the valve opposite the line 31 may be connected to an indicator 35 or to a control apparatus as desired. The valve as shown is connected directly to the T beam leg 13 to be moved thereby so that clockwise movement of the beam will connect the line 31 with the supply passage and counterclockwise movement will connect the line 31 with the exhaust port. Preferably, fixed stops 36 are provided in the casing to limit travel of the T beam.

In operation, a force in either direction on the torque arm 11 will tend to tilt the T beam clockwise. Movement of the beam clockwise will open the control valve to supply fluid under pressure to the line 31. Depending upon the adjustment of the distributor valve, the pressure will flow to either or both of the diaphragms 23 and 24 which will act through the connecting rods 25 to urge the T beam counterclockwise. When the pressure exerted by the diaphragms is sufficient to move the T beam to its neutral position, as shown, the control valve will be lapped and the parts will remain stationary with the forces on the T beam in balance. At this time, the indicator 35 will indicate the pressure acting on the diaphragms which is proportional to the force on the T beam so that the indication will be a direct measure of the load on the torque arm 11.

When the forces to be measured are relatively small, the distributor valve may be adjusted to cut off the line 27 and connect the lines 26 and 31. At this time, only the diaphragm 23 is effective so that a pressure thereon sufficient to produce full scale deflection of the meter will produce only a relatively small balancing force on the T beam. For medium forces the distributor valve may be turned to cut off the line 26 and connect the lines 27 and 31. At this time only the diaphragm 24 will be effective but since its radius is greater than that of the diaphragm 23, it will exert a larger turning force on the T beam. When the distributor valve is turned to its central position, both diaphragms will be effective so that a large turning force will be exerted on the T beam. It will be understood that the indicator could be provided with three separate scales selectively readable to indicate the torque values existing when the different diaphragms or when both diaphragms are operative.

The structure of the unit is indicated more clearly in Figure 2. As shown in this construction, the lever 17 is preferably made in the form of a rectangle pivoted adjacent one end on the bearing 18 with its opposite sides extending outside of the brackets 16 and the arms 14 and 15. A crosspin 37 connected between the sides of the lever spaced from its pivot is connected by a link 38 to the dynamometer torque arm 11. The roller 19 engages the under side of a crossbar 39 extending across the outer sides of the lever 17 while the roller 21 rides on the upper side of the cross end member 22 of the lever 17. With this construction, a downward force on the link 38 causes the crossbar 39 to bear down on the top of the roller 19 thereby to urge the T beam clockwise. Similarly, an upward force on the link tends to raise the roller 21, also to tilt the T beam clockwise. It will be noted that the arms 14 and 15 are of different lengths, these arms preferably being so proportioned that they will cause the same turning force on the T beam in response to the same force on the link 38.

While one embodiment of the invention has been shown and described in detail herein, it will be understood that this is illustrative only and is not intended as a definition of the scope of the invention, reference being had for this purpose to the appended claims.

What is claimed is:

1. A force measuring apparatus comprising a movably mounted member to be urged in one direction by a force to be measured, a pair of pressure responsive units connected to the member to urge it in the other direction, a control valve connected to the member, and means including a selector valve to connect the control valve selectively to either or both of the units to supply fluid thereto.

2. A force measuring apparatus comprising a pivoted beam to be urged in one direction about its pivot by a force to be measured, a pair of pressure responsive units engaging the beam at spaced points in its length to urge it in the other direction about its pivot, a control valve connected to the beam to be moved thereby to produce a regulated pressure, and means including a selector valve to connect the control valve selectively to either or both of the units.

3. A force measuring apparatus comprising a pivoted beam having arms extending on opposite sides of its pivot, a lever pivoted adjacent one end and lying adjacent and substantially parallel to the arms and adapted to be moved by a force to be measured, means on the lever engaging one side of one arm and the other side of the other arm whereby a force on the lever in either direction tends to tilt the beam in the same direction, a force producing unit connected to the beam to urge it in the other direction, and control means for the force producing unit connected to the beam to be controlled by movement thereof.

4. A force measuring apparatus comprising a pivoted beam having arms extending on opposite sides of its pivot, a lever pivoted adjacent one end and lying adjacent and substantially parallel to the arms and adapted to be moved by a force to be measured, means on the lever engaging one side of one arm and the other side of the other arm whereby a force on the lever in either direction tends to tilt the beam in the same direction, a pressure responsive unit connected to the beam to urge it in the other direction, and a control valve connected to the beam to be operated thereby and connected to the unit to supply actuating fluid thereto.

5. A force measuring apparatus comprising a pivoted beam having arms extending on opposite sides of its pivot, a lever pivoted adjacent one end and lying adjacent and substantially parallel to the arms and adapted to be moved by a force to be measured, means on the lever engaging one side of one arm and the other side of the other arm whereby a force on the lever in either direction tends to tilt the beam in the same direction, a pair of pressure responsive units connected to the beam at points in its length spaced different distances from its pivot to urge it in the other direction, a control valve connected to the beam to be moved thereby to produce a regulated pressure, and means including a selector valve to connect the control valve selectively to either or both of the units.

6. A force measuring apparatus comprising a T beam pivoted adjacent the juncture of its head and leg, a lever pivoted at one end and lying substantially parallel to the head of the T beam, means connected to the lever to urge it to tilt about its pivotal mounting, cross members on the lever engaging the top of the T beam head at one side of the beam pivot and the bottom of the T beam head at the other side of the beam pivot whereby tilting of the lever in either direction will urge the T beam in the same direction, a force producing unit connected to the leg of the T beam to urge it in the opposite direction, and control means for the unit connected to the T beam to be controlled thereby.

ALBERT J. ROSENBERGER.

REFERENCES CITED

The following references are of record in the file of this patent:

UNITED STATES PATENTS

| Number | Name | Date |
| --- | --- | --- |
| 1,129,073 | Connet | Feb. 23, 1915 |
| 1,298,630 | Schmidt | Mar. 25, 1919 |
| 1,424,357 | Hern | Aug. 1, 1922 |
| 1,624,588 | Essmann | Apr. 12, 1927 |
| 2,325,345 | Tate | July 27, 1943 |
| 2,331,871 | Tate | Oct. 19, 1943 |
| 2,343,181 | Heinz | Feb. 29, 1944 |

FOREIGN PATENTS

| Number | Country | Date |
| --- | --- | --- |
| 275,985 | Germany | July 1, 1914 |
| 465,587 | France | Feb. 10, 1914 |